United States Patent [19]

Caldwell

[11] 4,023,869
[45] May 17, 1977

[54] CROSSED AXIS TAPERED ROLLER BEARING ASSEMBLY

[75] Inventor: Samuel I. Caldwell, Aurora, Ill.

[73] Assignee: Caterpillar Tractor Co., Peoria, Ill.

[22] Filed: May 15, 1975

[21] Appl. No.: 577,809

[52] U.S. Cl. .................................. 308/214; 212/69
[51] Int. Cl.² .......................................... F16C 33/00
[58] Field of Search ....... 308/227, 8.2, 202, 207 R, 308/208, 214, 215, 231; 212/69, 70

[56] References Cited

UNITED STATES PATENTS

| 2,040,741 | 5/1936 | Hoke | 308/214 |
| 2,065,311 | 12/1936 | Hoke | 308/214 |
| 3,361,501 | 1/1968 | Messinger et al. | 308/219 |

Primary Examiner—Robert R. Song
Assistant Examiner—Richard A. Bertsch
Attorney, Agent, or Firm—Wegner, Stellman, McCord, Wiles, & Wood

[57] ABSTRACT

A heavy duty tapered roller bearing assembly is designed for use in such devices as the turntables which mount excavator superstructures on their tracked undercarriages. A raceway has two races having four faces that define an annular cavity, the cross section of which is a quadrilateral with converging opposite faces. Annular tapered bearing rollers have walls of a thickness to be compliant under the loads to which they are subjected in use, and the axes of rotation of alternate rollers are at 90° to one another with each roller having its tapered surface confined between two of the converging opposite faces of the cavity and having an end surface abutting a third face. The rollers have central circumferential arcuate grooves which slidably interfit with one another so that each roller is guided by the rollers which flank it; and the roller walls define lubricant chambers from which lubricant moves outwardly as the rollers rotate to lubricate the outer roller surfaces.

8 Claims, 4 Drawing Figures

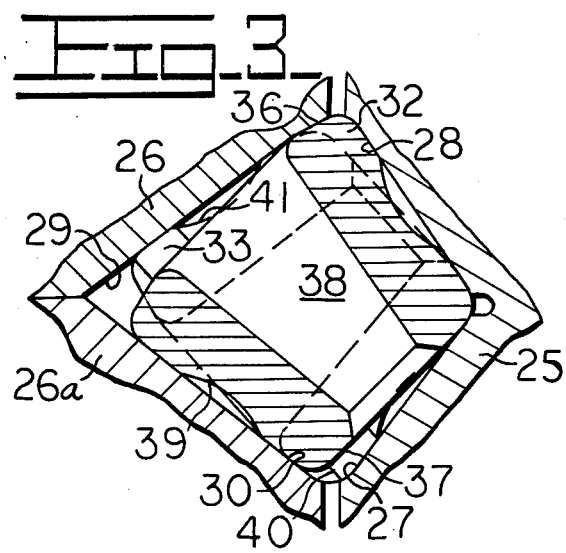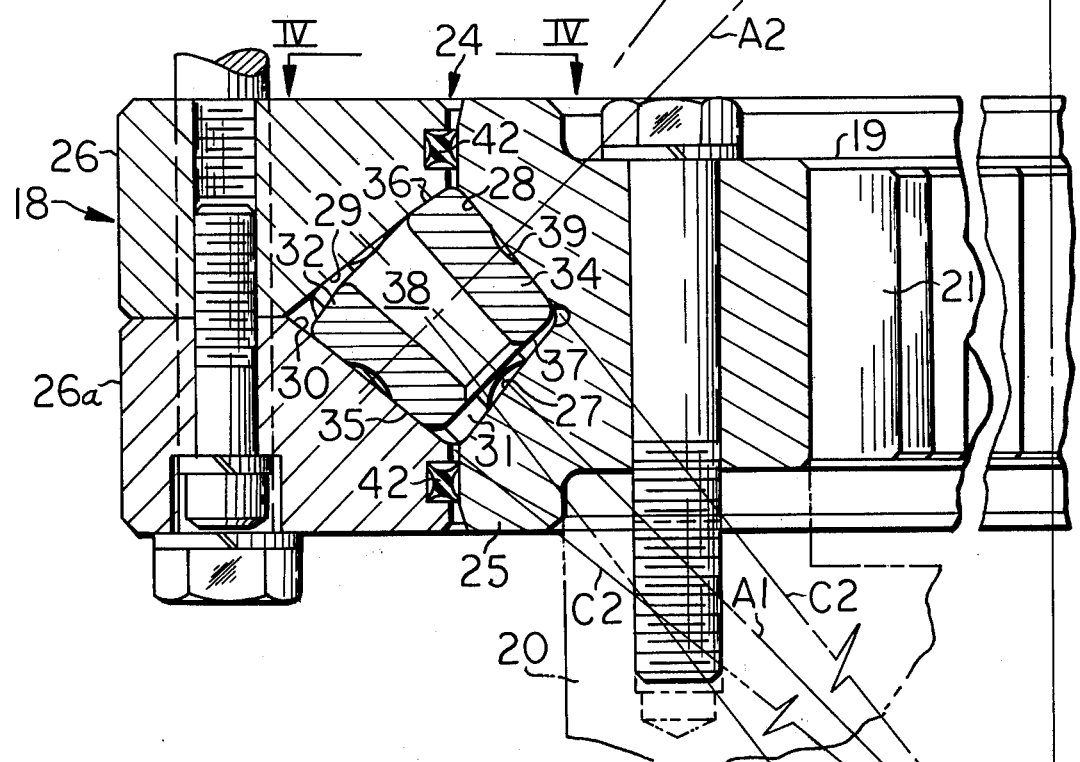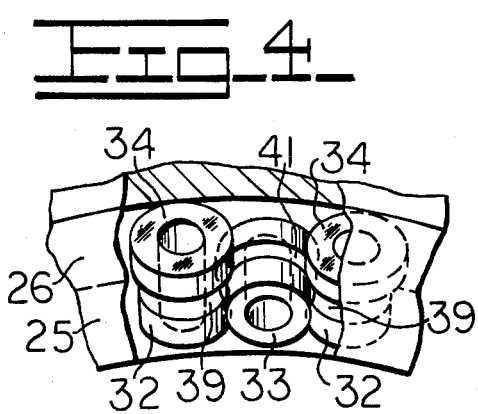

CROSSED AXIS TAPERED ROLLER BEARING ASSEMBLY

BACKGROUND OF THE INVENTION

Excavators and other heavy equipment have large superstructures which are rotatably mounted upon tracked undercarriages by means of turntable structures, commonly called swing hearings. Such turntables require very heavy duty bearing assemblies which are subjected to enormous strains when the equipment is in use. Thus, for example, an excavator or a long boom crane places heavy unbalanced loads upon the superstructure which must be transmitted to the undercarriage through the bearing assembly; so such bearing assemblies are particularly subject to Brinelling and other undesirable results of high localized stresses and overloads which tend to produce bearing failure.

About six years ago the idea of compliant ball races was developed for ball bearing assemblies. A compliant ball race is capable of deforming under load so as to reduce ball penetration of the raceway, lower the coefficient of friction, and reduce the tendency of the ball to Brinell the raceway.

The size and weight of devices such as excavators requires that their turntables have heavy bearing races which cannot practically be made compliant.

The heavy duty bearing assemblies required for excavators and the like constitute a particularly advantageous place to utilize crossed axis roller bearing assemblies as taught in British patent 800428. Such crossed axis roller bearing assemblies provide combined thrust and radial support. Disclosures of crossed axis roller bearings in less exacting environments are found in Hoke U.S. Pat. Nos. 2,040,741 and 2,065,311; in Dean U.S. Pat. No. 2,708,767; in Welton et al. U.S. Pat. No. 2,823,083; and in Lonngren et al U.S. Pat. No. 3,517,975.

All of the crossed axis bearing assemblies known to the present inventor either require spacing means to prevent contact between adjacent roller surfaces, or else result in marring of adjacent roller surfaces which then causes damage to the raceway surfaces.

SUMMARY OF THE INVENTION

In accordance with the present invention, tapered bearing rollers used in a crossed axis bearing assembly are annular, with the thickness of the roller walls being such that the rollers are compliant under the loads to which they are subjected in use—i.e., the rollers can flex slightly under load so as to reduce Brinelling of the races and other undesirable results which reduce the useful life of roller bearing assemblies.

Further, the rollers are provided with central, circumferential arcuate grooves, and contact between adjacent tapered rollers is confined to the arcuate grooves so that any scuffing or marring of the abutting roller surfaces is confined to areas which do not contact the faces of the bearing races.

In addition to preventing raceway damage, the interfitting grooves of the rollers of the present invention permit more rollers to be placed in an equivalent space, thus providing improved support and increased load carrying capability. Additionally, the structure permits each roller to be guided by the rollers which flank it.

Another advantage is that the annular roller walls define axial lubricant receiving chambers which enormously increase the lubricant carrying capacity of the entire assembly. Further, the smaller end of each such axial chamber is adjacent the circumferential surface of the next roller to it, and the rotation of the rollers when the turntable is being driven provides a sort of centrifugal pumping action which provides a circulation of lubricant through the chambers to lubricate the outer roller surfaces and more particularly the ends of the rollers which bear against a face of the raceway to carry the bearing thrust.

The use of hollow, compliant rollers provides further advantages which are in addition to those previously mentioned.

The compliant rollers will sustain increased deflection without the accompanying deformation found in solid rollers. This results in:

1. Increased capacity and/or fatigue life by allowing more area contact between rollers and races, reducing surface compressive stresses, and thereby also reducing the subsurface shear stresses which are the ultimate cause of roller failure.

2. The compliant rollers permit preloading of the bearing assembly to reduce differences in alignment of the races relative to each other and also to control alignment of the ring gear and drive gear which rotate the superstructure on the undercarriage.

3. The hollow roller minimizes the area of contact between the thrust surface on the end of the roller and the face of the outer race which is contacted by that thrust surface, thus reducing the area where sliding occurs and confining it to an area in which there is no rolling contact of the adjacent rollers with the race.

Finally, the structure reduces the effects of overturning moment forces which tend to tip the superstructure on the undercarriage as boom loads unbalance the superstructure. This results from the fact that the effective load centers of the bearing assembly are located outside of the geometric tapered roller cone apices on the bearing axis, so that while the angle between the axes of adjacent rollers is 90°, the included angle at the roller axes intersection point between the effective load centers of the leaving is substantially greater than 90°.

THE DRAWINGS

FIG. 2 is a fragmentary sectional view on an enlarged scale illustrating the bearing assembly and the axes of the rollers in the assembly;

FIG. 3 is a fragmentary sectional view of a portion of FIG. 2 on an enlarged scale; and FIG. 4 is a fragmentary section on a reduced scale taken substantially as indicated along the line IV—IV of FIG. 2.

DETAILED DESCRIPTION OF THE INVENTION

Figure 1:
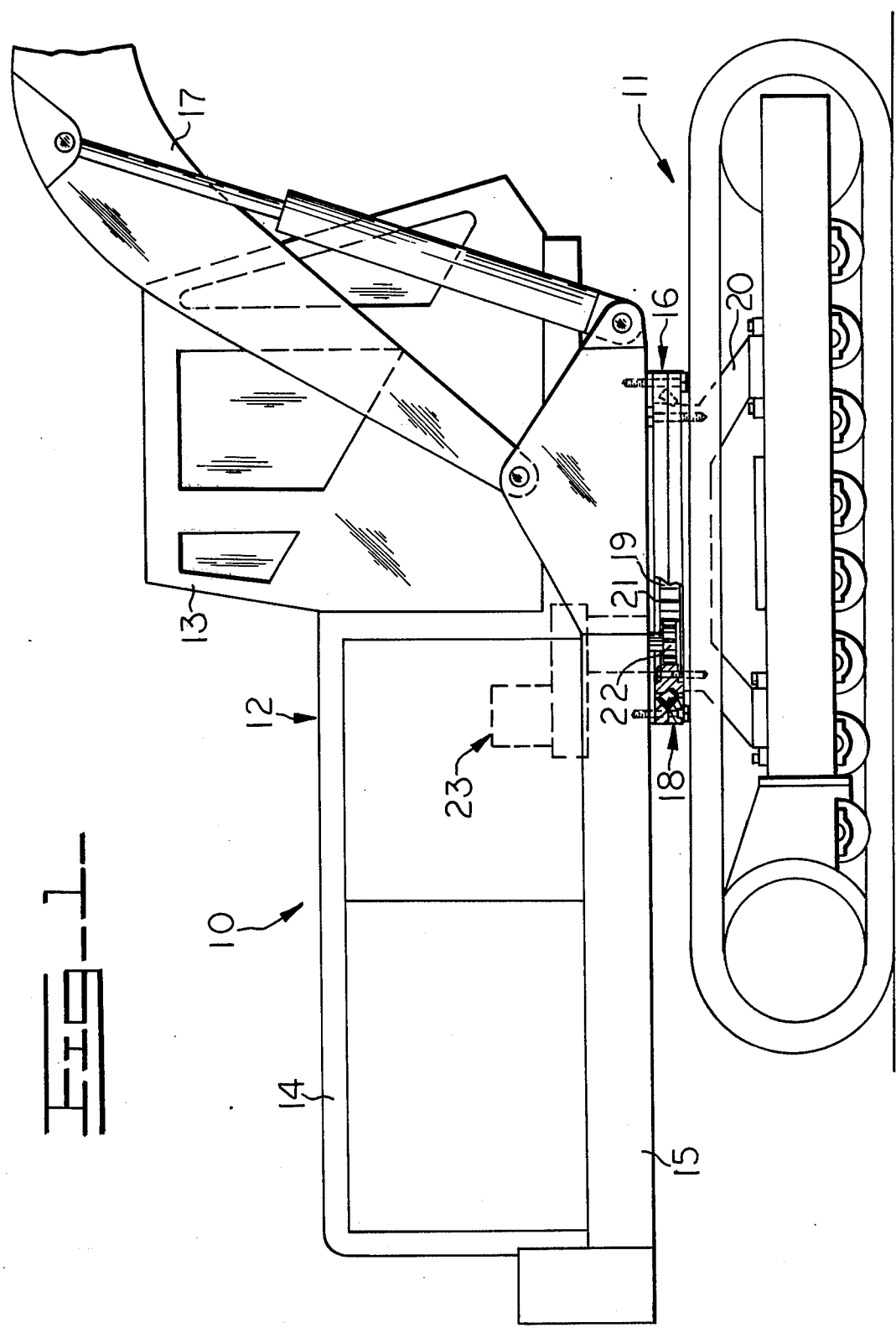
FIG. 1 is a fragmentary side elevational view of a typical heavy duty excavator with a part of the turntable shown in section.

Referring to FIG. 1, an excavator, indicated generally at 10, has a mobile, tracked undercarriage 11 upon wghich there is mounted a superstructure or car body, indicated generally at 12, which includes an operator's cab 13 and a power plant 14 which are carried upon a common frame 15. The superstructure 12 is rotatably mounted upon the undercarriage 11 by means of a turntable structure, indicated generally at 16. Also mounted upon the superstructure 12 is a working implement such, for example, as the partially illustrated boom 17. Although the invention is illustrated as applied to an excavator, it is obvious that the invention is equally applicable to any heavy industrial equipment which has relatively rotatably mounted parts. Typical of other such equipment are mobile cranes, including tracked cranes, truck cranes and railway cranes, etc.

The turntable 16 includes a tapered roller bearing assembly, indicated generally at 18, and a ring gear 19 which is fixed to a base 20 on the undercarriage and has internal teeth 21 which are engaged by a drive pinion 22 of a drive mechanism, indicated generally at 23. For details of the drive mechanism and mounting, reference is made to U.S. Pat. No. 3,739,652, issued June 19, 1973, to applicant's assignee.

As best seen in FIG. 2, the bearing assembly 18 includes a raceway, indicated generally at 24, that is formed by a one-piece race 25 and a split race 26-26a. The race 25 may be integral with the ring gear 19 or secured thereto; and in either event they are both secured to the base 20 on the undercarriage, as by a ring of bolts. The split race 26-26a is secured to the superstructure frame 15, as by bolts.

The races 25 and 26-26a have four faces, 27, 28, 29 and 30 that define an annular cavity 31, the cross-section of which is a quadrilateral with the opposite faces 27 and 29 converging toward the top and the opposite faces 28 and 30 converging toward the bottom.

Rotatably mounted in the annular cavity 31 are bearing rollers 32 which are on parallel axes A1 and bearing rollers 33 which are on axes A2 at 90° to those of the bearing rollers 32 and which alternate with the bearing rollers 32. All of the rollers are identical, so only the one roller 32 illustrated in FIGS. 2 and 3 will be described in detail.

The roller 32 consists of an annular body 34 which has a tapered circumferential surface 35 that is confined between the converging faces 28 and 30 of the annular cavity 31, and an end surface 36 of the roller 32 abuts the face 29 of the cavity 31 while the opposite end surface 37 of the roller 32 is spaced from the face 27 of the cavity. The annular body 34 of the bearing roller 32 defines an axial chamber 38.

In the tapered circumferential surface 35 of the roller is a central circumferential groove 39 which is seen in FIGS. 2 and 3 to be shallow and arcuate.

As previously stated, the rollers 33 are identical with the rollers 32 and are mounted upon parallel axes A2 which are oriented at 90° to the axes A1 as indicated in FIG. 2. Thus, the rollers 33 have their tpered circumferential suffaces confined between the converging faces 27 and 29, and an end surface 40 of the roller 33 abuts the face 30 of the cavity as indicated in FIG. 3. The rollers 33 have shallow, arcuate central circumferential grooves 41 which slidably interfit with the grooves 39 of the rollers 32 as best seen in FIG. 4, so that each of the rollers 32 is guided by the two rollers 33 which flank it, and vice versa. The only portions of the rollers 32 and 33 which are in contact with one another are the grooves 39 and 41, so that any scuffing or rubbing of the roller surfaces which may occur by reason of the contact is confined to areas which do not contact the faces 27, 28, 29 and 30 of the races.

When the motor 23 is operated to rotate the spur gear 22 in contact with the internal teeth 21 of the ring gear 19, the entire superstructure including the race 26-26a rotates about the race 25, with the bearing rollers 32 and 33 serving as combined radial bearings and thrust bearings by reason of the way in which they are confined in the annular cavity 31.

The annular body 34 of each of the bearing rollers 32 and 33 is of a thickness to be compliant under the loads to which the bearing rollers are subjected in use. What this thickness is depends, of course, upon the nature and size of the equipment in which the bearing assembly 18 is used, and also upon the particular grade of steel or alloy which is used in fabricating the rollers 32 and 33; and the proper wall thickness for different operating conditions may be readily determined by skilled engineers.

The annular cavity 31 is filled with a heavy lubricating grease which also fills the chambers 38 defined by the annular roller bodies 34, so the hollow rollers greatly increase the lubricant capacity of the system as compared with one using solid rollers.

The rotation of the rollers 32 and 33 as the superstructure 10 is rotated upon the undercarriage 11 causes a sort of centrifugal pumping action as the tapered circumferential surfaces 35 of the rollers 32 and 33 roll on the faces of the cavity 31. The rolling action of the rollers 33 forces lubricant into the lower ends of the cavities 38 of the rollers 32 from the space between the wall 27 and the roller end surface 37, thereby moving lubricant outwardly and onto the end surface 36 of the roller 32 where lubrication of the sliding thrust surface is particularly important. Conversely, the circumferential surfaces of the rollers 32 provide a pumping action which circulates lubricant into the chambers 38 of the rollers 33 out of the space between the end surfaces of the rollers 33 and the cavity wall 28.

Extruded Teflon seals 42 which are of a cruciform shape snap into grooves in the race 26-26a to prevent leakage of lubricant from the cavity 31.

Referring again to FIG. 2, the effective load centers of the rollers 33 are indicated by a line C1 which is seen to diverge from the axis A1 of the roller 32 so that a projection of the effective load center C1 extends outside an imaginary cone C2 which is a projection of the tapered circumferential surface 35 of the roller 32. Correspondingly, the rollers have effective load centers along a line C3. As a result, the angle between the effective load centers C1 and C3 is considerably greater than is the angle between the geometric axes A1 and A2; and the result is to reduce the effect an the bearing of the overturning moment tending to tip the superstructure on the undercarriage as boom loads unbalance the superstructure.

The foregoing detailed description is given for clearness of understanding only and no unnecessary limitations should be understood therefrom as modifications will be obvious to those skilled in the art.

What is claimed is:

1. A heavy duty tapered roller swing bearing assembly comprising, in combination:
    a raceway including first and second races which have four faces that define an annular cavity the cross-section of which is a quadrilateral with converging opposite faces, one of said races being rotatable relative to the other;
    and tapered bearing rollers rotatably supported in said cavity with the axes of rotation of alternate rollers at substantially 90° to one another, each of said rollers having a tapered circumferential surface confined between two of the converging opposite faces of the cavity and having an end surface abutting a third face, and said rollers having shallow arcuate circumferential grooves generally midway between their ends which slidably interfit with one another, whereby each roller is guided by the rollers which flank it.

2. The combination of claim 1 in which the rollers are annular, providing walls which define an axial lubricant receiving chamber from which lubricant may move outwardly as the roller rotates to lubricate the outer roller surfaces.

3. The combination of claim 2 in which the annular roller walls are of a thickness to be compliant under the loads to which they are subjected in use.

4. The combination of claim 1 in which the rollers are annular, and the annular roller walls are of a thickness to be compliant under the loads to which they are subjected in use.

5. A heavy duty tapered roller swing bearing assembly comprising, in combination:
   a raceway including first and second races which have four faces that define an annular cavity the cross-section of which is a quadrilateral with converging opposite faces, one of said races being rotatable relative to the other;
   tapered bearing rollers rotatably supported in said cavity with the axes of rotation of alternate rollers at substantially 90° to one another, each of said rollers having a tapered circumferential surface confined between two of the converging opposite faces of the cavity and having an end surface abutting a third face, and said rollers being annular with the annular roller walls of a thickness to be compliant under the loads to which they are subjected in use;
   and means guiding said rollers with respect to one another.

6. The combination of claim 5 in which the annular roller walls define lubricant receiving chambers from which lubricant may move outwardly as the rollers rotate to lubricate the roller surfaces.

7. A heavy duty roller swing bearing assembly comprising, in combination:
   raceway means adapted to receive bearing rollers, said raceway means including an inner race and an outer race the thicknesses of which are such that they deflect to no significant extent under the loads to which they are subjected, said inner and outer races defining an annular cavity;
   and bearing rollers rotatably supported in said annular cavity, each of said bearing rollers having an annular wall which is of a thickness to be compliant under the loads to which said rollers are subjected in use, the compliance of said rollers being sufficient to substantially eliminate deformation of said inner and outer races.

8. The combination of claim 7 in which the annular wall of each bearing roller surrounds a chamber which is open at both ends.

* * * * *

UNITED STATES PATENT AND TRADEMARK OFFICE
CERTIFICATE OF CORRECTION

PATENT NO. : 4,023,869
DATED : May 17, 1977
INVENTOR(S) : Samuel I. Caldwell

It is certified that error appears in the above–identified patent and that said Letters Patent are hereby corrected as shown below:

Col. 2, line 41, "leaving" should be --bearing--;

Col. 2, line 59, "wghich" should be --which--;

Col. 3, line 47, "tpered" should be --tapered--;

Col. 4, line 40 --32-- should be inserted after "rollers";

Col. 4, line 44, "an" should be --on--.

Signed and Sealed this

Fourth Day of October 1977

[SEAL]

Attest:

RUTH C. MASON
Attesting Officer

LUTRELLE F. PARKER
Acting Commissioner of Patents and Trademarks